Nov. 13, 1923.
M. H. SPIELMAN ET AL
ELECTRIC MOTOR SWITCH
Filed Aug. 5, 1920
1,474,180
2 Sheets-Sheet 1
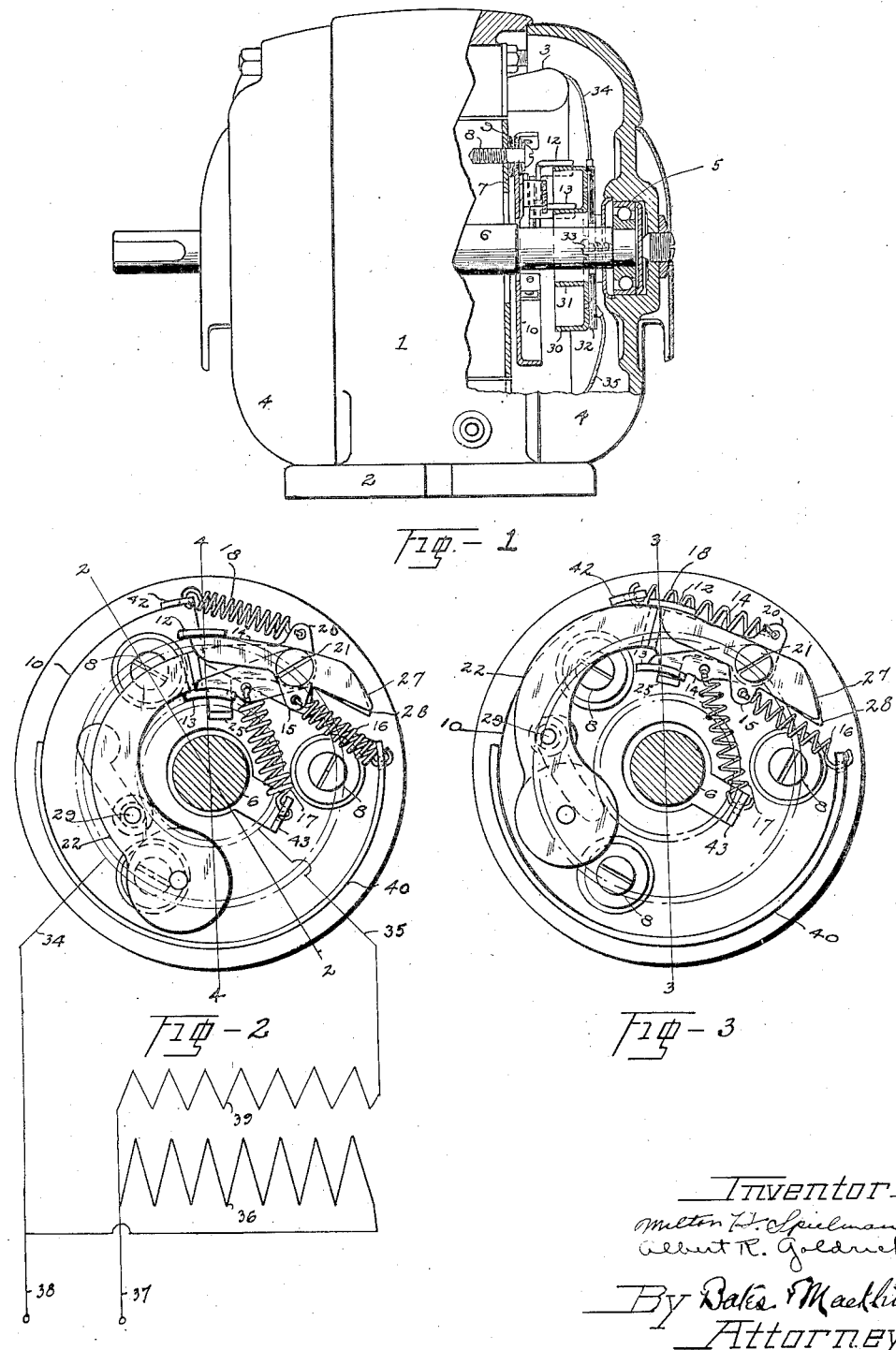

Nov. 13, 1923. 1,474,180
M. H. SPIELMAN ET AL
ELECTRIC MOTOR SWITCH
Filed Aug. 5, 1920 2 Sheets-Sheet 2
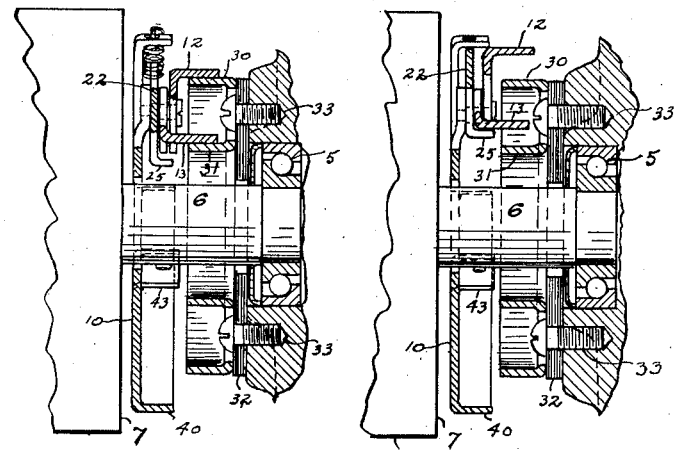
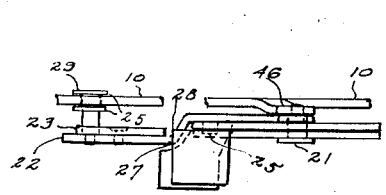
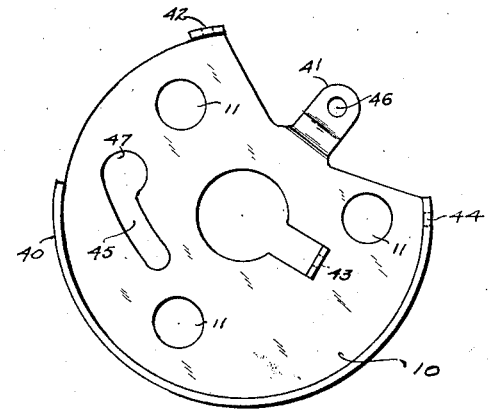

Patented Nov. 13, 1923.

1,474,180

UNITED STATES PATENT OFFICE.

MILTON H. SPIELMAN AND ALBERT R. GOLDRICK, OF CLEVELAND, OHIO, ASSIGNORS TO THE DOMESTIC ELECTRIC COMPANY, OF CLEVELAND, OHIO, A CORPORATION OF OHIO.

ELECTRIC MOTOR SWITCH.

Application filed August 5, 1920. Serial No. 401,553.

*To all whom it may concern:*

Be it known that we, MILTON H. SPIELMAN and ALBERT R. GOLDRICK, citizens of the United States, residing at Cleveland, in the county of Cuyahoga and State of Ohio, have invented a certain new and useful Improvement in Electric Motor Switches, of which the following is a full, clear, and exact description, reference being had to the accompanying drawings.

This invention relates to centrifugal electric switches. The essential object of the invention is to provide a simple, effective switch adapted to move to open or close a circuit when the rotary element to which it is attached attains a predetermined speed, and to reverse the movement when the speed falls below a predetermined point.

A more particular object of the invention is to so construct the switch that its opening movement may be accomplished at a different speed than the speed at which the closing movement occurs. The principle on which our switch is designed is readily adaptable for use in connection with motors of a type employing auxiliary starting windings in addition to a working winding; the auxiliary windings being cut out of the circuit upon the attainment of a predetermined speed and remaining electrically disconnected until the rotor falls to a speed considerably below the cutting out speed.

More specific objects of the invention are to so construct the switch that it may be rapid and positive in operation, avoiding arcing and consequential wear, and capable of being manufactured for quantity production purposes from sheet metal by punching and stamping operations.

A further object of this invention is to construct a switch in which the elements have been reduced to a minimum, while retaining all the highly desirable characteristics of accurate and positive performance. These parts are dissimilarly shaped in such a manner that they may be accurately and rapidly produced and also may be assembled by a few very simple steps. The weights of the elements actuated by the centrifugal force are so determined that the same size spring is used in controlling these elements. Such an arrangement eliminates confusion and the possibility of errors of assembling, when the springs are being placed in the switch.

Further objects will become evident in the following description relating to the accompanying drawings, which illustrate a preferred form of the switch as applied to an induction motor. The essential characteristics are summarized in the claims.

In the drawings Fig. 1 is a side elevation of a motor equipped with our switch, a portion of the motor being axially sectioned to illustrate the position of the switch parts within the motor; Fig. 2 is a side elevation which illustrates the moving elements of the switch parts and showing diagrammatically the starting and running windings; Fig. 3 is a similar view showing the same switch elements in their open or running speed position; Fig. 4 is a cross section taken substantially along the line 4—4 of Fig. 2 and illustrates the contact position of the moving elements of the switch with the stationary parts; Fig. 5 is a similar cross section along the line 3—3 of Fig. 3 and illustrates the open or running position of the contact elements and their relation to the coacting stationary parts; Fig. 6 is an end view of a part of the supporting plate showing the pivot of the levers; Fig. 7 is a side view of the unassembled supporting plate; Fig. 8 is a cross sectional view of this plate and insulating means; and Fig. 9 is a side elevation of the collector rings, illustrating the relative position of the starting coil terminals.

Describing the particular embodiment of our invention shown in the drawings by the use of reference characters, 1 indicates a motor with a suitable base 2 and carrying the field winding indicated at 3. End bearing plates 4 are fitted to the part 1 and have suitable bearings arranged as shown at 5 for an armature shaft 6. On the armature shaft is carried the usual rotor 7. Suitably insulated from the rotor 7 and carried rigidly thereby is a supporting disk 10 carrying the movable switch contact elements and actuating means therefor to be hereinafter described.

The contact elements coact with concentric rings which are in the form of a pair of collector rings 30 and 31, each having a flange secured to an insulating support 32, which is rigidly secured to the end member 4 of the motor frame by screws indicated at 33. To these non-rotating members may be connected wires indicated at 34 and 35, one connected with each member and leading to the coils as will be presently described.

The disk 10 is shown as secured to the rotor by screws 8 extending thru insulating washers 9 at each side of the plate, while the shank of the screw passes thru an enlarged opening filled with insulation material. The disk 10 is thereby insulated from the rotor while securely fastened thereto. On this disk 10 a pair of contact arms are shown as pivotally mounted, each comprising arcuate contact portions 12 and 13, turned laterally from shanks 14 pivoted at 21 to the disk support 10 and having counterweights as at 27 and 28, on the opposite side of the pivot 21. A centrifugal weight arm 22 is likewise mounted on the pivot 21 and extends in an arcuate path part way around the rotor shaft 8, normal to the collector rings 30 and 31 but spaced therefrom.

The supporting plate, as shown in Fig. 7, is drawn from a sheet metal blank, with a flange 40 extending about the plate slightly more than half its circumference. Spring clearances are provided on both sides of an upset pivot supporting lug 41 and lugs 42 and 43, normal to the supporting plate, furnish suitable spring anchorages. The weight of flanged portion serves as a counterbalance for the opposing weight of the contact elements and the end 44 is utilized as a spring anchorage.

An arcuate slot 45 with an enlarged opening 47 at its outer end is provided to slidably receive a lug 29 for bracing and guiding the lever 22 and which will hereinafter be referred to.

On the outer contact arm 12 a small spring arm 15, which is integral with it, is engaged by a spring 16, having the other end hooked to the flanged portion 44 of the supporting plate 40, while the spring 17 for the inner contact arm is hooked thru an opening on the shank portion 14. The spring 18 for the centrifugal weight arm is hooked to a small arm 20, which is integral with the weight arm and the other end is hooked to the lug 42 on the support 10.

The three springs are of the same diameter and gage of wire and have an equal number of coils, but the amount of stretch of each spring is when in position different, due to a variation in the spring leverages.

The collector rings 30 and 31 are secured to an insulating disk 32, which has slots 50 provided to admit the terminals 34 and 35, by rivets 48 in the form of a U-shaped cup with appropriate clearance holes 49, and then parted by cutting the concentric slot 51. By thus mounting the rings concentrically, accuracy of the contact surfaces is assured. This results in even wear and consequent greater life of the switch parts.

The contrifugal weight arm is arranged so that it may comprise more than a half circle and have its weighted end, opposite the pivot 21 stand in a position normally bringing the centre of gravity of this arm nearly diametrically opposite this pivot, but just slightly off from the centre, whereby the outward movement of the arm 22 may be accelerated under the action of the centrifugal force, by reason of its centre of gravity continually moving away from the centre of rotation. This change of the position of the centre of gravity, from a point nearly opposite its pivot to a point, bringing the line of force thru the pivot and the centre of gravity, farther and farther from the centre of rotation, increases the centrifugal component, so that the latter part of the outward movement of this arm is much more rapid than the first or inner portion of the movement. By adjusting the tension of the spring 18 in proper relation to the weight of the arm and positioning the centre of gravity with relation to the centre of rotation, we may cause this movement to occur suddenly after the rotor has attained the predetermined speed and thereby accomplished the entire outward movement of the arm during a comparatively few rotations of the rotor.

To cause this arm to move the contacts 12 and 13 outwardly, we provide an offset in the arm forming a shoulder adapted to strike the corner 28 of the outer contact 12. A lug 25 (on 22) may then strike and raise the inner contact, after having raised the outer contact. As the arm 22 moves outwardly, the first portion of its movement preferably does not affect the movement of the contact arm 12, but attains a certain acceleration in its outward movement, while the pressure of the contact arms is maintained uniform, due to the centrifugal force exerted upon the counterweighting parts of the contact arms. It is apparent that the instant the outer contact is raised the starting circuit is cut out, even though the inner contact 13 may still be in engagement with the inner collector ring 31. By thus striking the outer contact first, the rapidity of break is much greater than if both contacts were thrown out at the same time. By arranging the centrifugal weight arm and the contact arm as we have shown the proper working of the switch is assured, even though the rate of rotation of the rotor were to remain at the throw out speed, as the arms continue to move outwardly to a position stop where the component forces urging them outwardly are at a maximum. It is intended that the spring forces acting on the various arms are greater at this maximum outer position, but the springs are so designed that they have sufficient strength to return the arms to a proper starting position at the same time they exert forces considerably less than the centrifugal force holding these parts out.

A reduction of the speed then to a very much lower speed than the speed at which the contacts are moved outwardly, is necessary before the springs will overcome the centrifugal force acting at the maximum outward component of the arm 22.

In the embodiment, a motor circuit including a working coil is diagrammatically illustrated in Fig. 2 at 36 directly connected across the wires 37 and 38. A starting coil 39 is connected at one end to the wire 38 and at the other end thru the wire 34 to the collector ring 30. The outer collector ring 31 is connected thru the wire 35 to the line wire 37. When the contacts 12 and 13 are in engagement with the concentric collector rings 30 and 31, they form a constant bridge across these rings, the current passing from one ring to the other thru the contact arms and pivot. Thus during the starting of the motor the switch is in the position shown in Figs. 2 and 4 in which the starting coil operates in parallel with the working coil 36 and the contacts 12 and 13, maintained in contact with the collector rings 30 and 31 by the springs 16 and 17, while rotating about these rings, close the circuit across the same.

The centrifugal arm 22 may carry a weight washer 23 properly secured at its outer end, and a stop pin 29, provided with appropriate shoulders 25, which may be adapted to slide in an arcuate path about the pivot centre 46 and in the slot 45 of the supporting disk 10, and may act against the ends of the slot as a positive inward and outward stopping means for properly positioning the inward and outward locations of the centre of gravity of the centrifugal weight arm 22. It may also serve as an additional weight producing means. Hence as the rotor attains a predetermined speed the centrifugal arm starts its outward movement and as the rotor increases in speed the edge 27 engages the corner of the outer contact 28 at a time when the arm 22 is moving outwardly with comparative rapidity and the centrifugal force acting on the arm causes the contact to be suddenly separated from the outer collector ring, breaking the circuit through the starting coil 39 and causing the current subsequently delivered to pass only thru the working coils 36. A further outward movement of the arm 22 raises the inner contact from the inner collector ring and comes to a positive stop by means of the stop pin 29 to the running position shown in Fig. 3.

Upon shutting off the current passing thru the coil 36 the motor at once diminishes its speed, but as the arm 22 is in the position at which the least centrifugal force is required to maintain the outer position, the motor slows down to a much lower speed than that at which the contacts were removed from the collector rings before the contacts are again brought into engagement therewith. By way of illustration one form of motor on which we have employed this switch uses the starting coils up to substantially thirteen hundred fifty (1350) revolutions per minute, whereupon the contacts are almost instantaneously separated from the concentric collector rings and the motor may then increase its speed up to about seventeen hundred fifty (1750) revolutions per minute, and may decrease its speed to substantially eight hundred fifty (850) revolutions per minute before the contacts again engage the collector rings.

From the foregoing description it is evident that our switch lends itself to construction, such that may have a circuit breaking action in which arcing and consequent wear have been reduced to a minimum, and at the same time any desired combination of opening and closing speeds may be obtained. Furthermore, a minimum number of elements are employed and these elements are simple in shape and incidentally can be cheaply and accurately made. It will also be seen that we have designed a switch embodying the present invention, in which the assembling can be expeditiously and accurately accomplished without the employment of any extraordinary mechanical skill. Another advantageous characteristic of our switch is that it is very compact and may occupy a comparatively small space, which is very necessary in adapting it to some types of motors.

Having thus described our invention, we claim:—

1. A centrifugal switch comprising stationary concentric terminal cylinders, the outer cylinder having an inwardly extending flange and the inner cylinder having an outwardly extending flange, an insulating member secured to the flanges of said cylinders, electrically connected, rotatable and radially movable brushes contacting with the outer surfaces of said cylinders, means for resiliently maintaining the brushes in engagement with the respective cylinders, and means for causing disengagement from said cylinders at predetermined speeds of rotation.

2. A centrifugal switch comprising stationary concentric terminal rings having contact surfaces of different diameter, one being disposed inside of the other, and electrically connected rotatable brushes resiliently maintained in engagement with said rings below a predetermined speed, and means including a single weight arm actuated by centrifugal force for moving both of said brushes away from said rings at a predetermined speed of rotation, all of the movable members having a common pivotal center.

3. The combination, with a rotor and relatively fixed parallel rings coaxially mounted with relation to the rotor, and having contact surfaces in radial alignment, a brush engaging each ring and pivotally carried on said rotor, and means for resiliently maintaining each brush in independent engagement with a ring, and centrifugally actuated means movable independently of the brushes, and means for interconnecting the brushes and said last named means whereby outward movement of said means may cause disengagement of the brushes from the rings at a predetermined speed.

4. In a centrifugal switch, the combination with a rotary member, a pair of terminal contact rings mounted concentrically of the axis of said rotary member, a brush pivoted on the rotary member for engaging each of said rings, means for yieldingly and independently holding each of said brushes into engagement with said ring, said brushes being electrically connected, a weight member and resilient means independent of the brushes tending to draw it toward the center, said weight member being adapted to move outwardly under the influence of the centrifugal force, connections whereby said weight member may suddenly move both of said brushes to disengage them from the rings upon the attainment of a predetermined speed.

5. A centrifugal switch comprising a rotary member, a pair of concentric cylinder rings mounted coaxially of said rotary member, a brush normally yieldingly engaging each ring, a weight arm pivoted to the rotary member and movable outwardly independently of each brush but being adapted to cause disengagement of one of the brushes from its ring during such outward movement, yielding means independent of the brushes normally tending to hold the weight arm inwardly, and means whereby a complete outward movement of such arm results in the disengagement of both brushes, and the holding of said brushes thus disengaged until the rotor reaches a comparatively low predetermined speed.

6. A centrifugal switch comprising a rotary member, a pair of stationary concentric contact rings, brushes movably mounted on the contact arm, and yielding means for normally causing engagement of a brush with each ring, a single centrifugally actuated weight element movably mounted on said rotary member, yielding means for holding the brushes in engagement with the rings and tending to hold said weight element, inwardly coacting shoulders between the weight arm and brushes whereby the weight element may successively disengage the brushes and maintain disengagement until a comparatively low predetermined speed is reached and counterbalancing means on the rotary member opposite the weight arm and brushes whereby the switch may be balanced in its normal running speed.

7. A centrifugal switch comprising a rotary member, a pair of terminal rings concentric with said rotary member, a brush element for each ring, and a weight lever for causing outward movement of said elements, said weight lever and brush elements having a common pivotal center, and springs for said lever and brush elements, each spring being connected at one end to the rotary member, all of said springs being formed initially of the same size and strength and being so attached as to permit a comparatively heavy weight arm to start to move before permitting movement of the brushes.

8. The combination, with a rotor and relatively fixed parallel rings coaxially mounted with relation to the rotor, a counterbalanced brush engaging each ring and carried by a common pivot on said rotor, centrifugally actuated means movable independently of the brushes, and means for interconnecting the brushes and said last named means whereby outward movement of said means may cause successively disengagement of the brushes from the rings each at a respective predetermined speed.

9. In a centrifugal switch, a pair of flanged cylindrical contact rings, said contact rings having radial flanges, the flange on one cylinder extending inwardly, the flange on the other cylinder extending outwardly, an insulating member comprising a mounting for the contact rings secured to said flanges, there being an annular space between the respective flanges when so positioned on the insulating member.

10. In a centrifugal switch, the combination of a rotary support, a pair of flanged concentric contact rings having cylindrical contact surfaces normal to the flanges, a pair of arms carrying brushes having a common pivotal center in contact with the rings, a weighted lever mounted to rotate about this pivotal center and means carried by the weighted lever whereby successive disengagement of the brushes from said contact rings may be obtained at predetermined speeds.

11. In a centrifugal switch, the combination of a rotary support having a flanged portion serving as a counterbalance, a pair of cylindrical contact rings having contact surfaces in radial alignment, a pair of arms carrying brush portions in contact with said rings and having a common pivotal center positioned on the rotary support opposite said counterbalancing flange, a weight lever rotatably mounted at the same pivotal center as the brush arms, and independent resilient means secured to each of said arms and said support for normally maintaining each of said arms in its inward position.

12. In a centrifugal switch, the combination of a rotary support having a flanged counterbalancing portion, a pair of arms having brushes positioned thereon, a pair of contact rings mounted concentrically of said support, one of said brushes being positioned at a greater radial distance from the center of rotation than the other, a weight arm having a common pivotal center with the brush arms, and means on said weight arm for causing the successive disengagement of said brushes from the contact rings at predetermined speeds.

13. In a centrifugal switch, a pair of flanged concentric collector rings having cylindrical contact surfaces normal to the flanges and a supporting member formed of insulating material secured to said flanges, the outer surfaces of the cylindrical portions of the rings comprising contacting surfaces.

In testimony whereof we hereunto affix our signatures.

M. H. SPIELMAN.
ALBERT R. GOLDRICK.